UNITED STATES PATENT OFFICE.

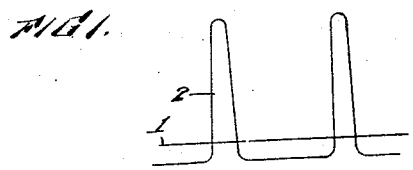
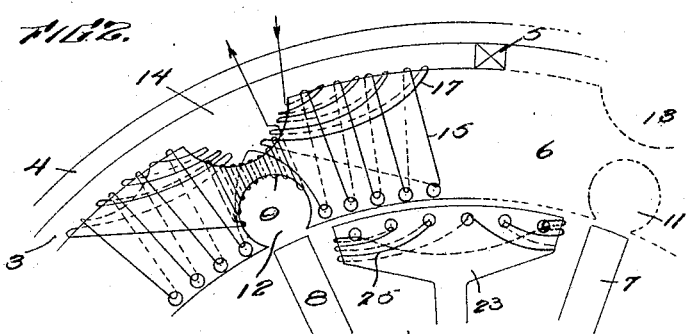
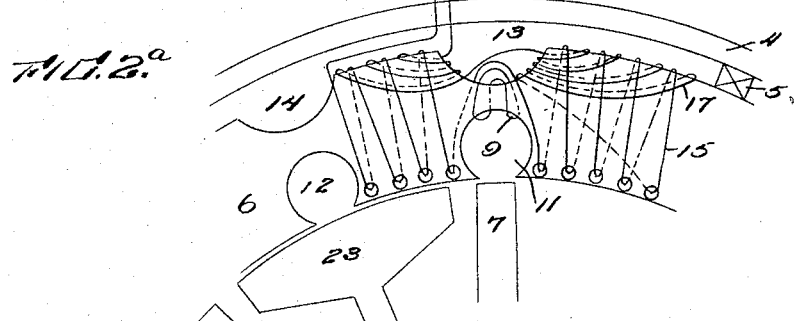
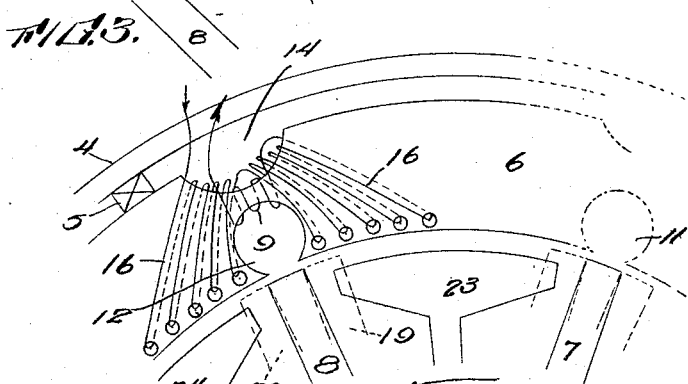

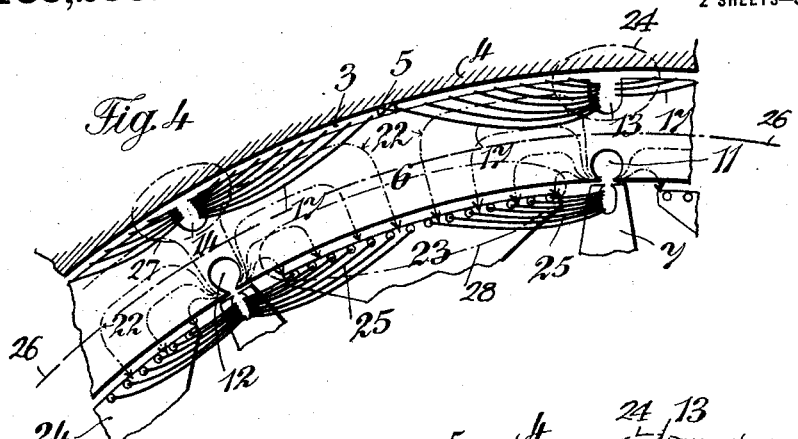
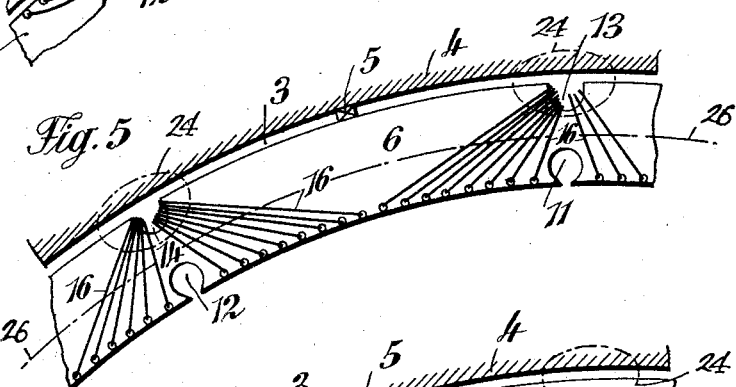
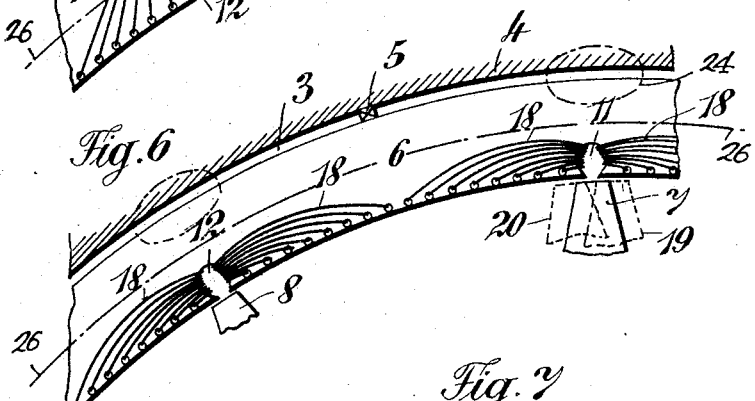
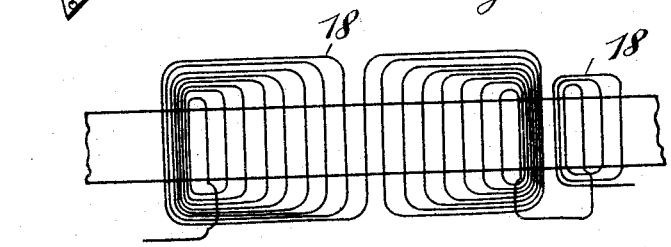

JEAN LUCIEN FARNY, OF ZURICH, SWITZERLAND.

DYNAMO-ELECTRIC MACHINE.

1,183,286.     Specification of Letters Patent.     Patented May 16, 1916.

Application filed February 24, 1910. Serial No. 545,702.

*To all whom it may concern:*

Be it known that I, JEAN LUCIEN FARNY, a citizen of the Republic of Switzerland, residing at Fehrenstrasse, Zurich, Switzerland, have invented certain new and useful Improvements in Dynamo-Electric Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to dynamo-electric machines adapted to generate alternating currents having unequal positive and negative values.

The main object of my invention is to increase the efficiency of machines of this type by providing windings which are so related that the portions thereof mutually react to nullify the self-induction or reactance of the coils and thereby cause a larger output than would otherwise be possible.

In the accompanying drawings which are illustrative of my invention—Figure 1 is a diagram showing the relative values of the positive and negative potential waves; Figs. 2 to 7 are diagrams illustrating the several windings which may be employed in carrying out my invention.

In the diagram shown in Fig. 1, abscissæ along the zero line 1, represent intervals of time and corresponding ordinates the positive or negative values of the electro-motive forces generated at any instant, the curve 2, indicating that the positive values are much greater than the negative but of shorter duration. Currents of this type find many useful applications. For instance, when applied to a circuit containing apparatus for striking an arc, the arc electrodes may be so arranged that the high voltage positive waves will be permitted to pass while preventing the passage of the low voltage negative waves, so that an intermittent rectified current is obtained. Unidirectional currents may be readily obtained from such unequal current waves by the use of asymmetric cells, vapor tubes, etc.

For the purpose of explaining my method of accomplishing the desired result above described, I have shown in Fig. 2, a portion of a laminated ring armature core 6, supported within a frame 4, and spaced therefrom by non-magnetic blocks 5, leaving an air-gap 3. The core is provided with radially extending grooves 11—13, 12—14, equal to or a multiple of the narrow rotor poles 7, 8 and equally spaced around the circumference of the armature core. The narrow poles 7, 8 are of one polarity and the intermediate broad poles 23, 24 are of the opposite polarity. Within each of the grooves are concentrated coils 9, through which the flux from the narrow rotor poles suddenly changes as the pole passes from position 19 to position 20, and by which sudden change there is generated the high voltage current wave of short duration indicated in the curve of Fig. 1. It would be impossible to obtain such a sudden rise in the current wave, however, unless the reactance of the coils 9 are nullified because the choking effect of the self induced electro-motive force would very materially limit the current output. I, therefore, associate with each coil 9, coils 15, upon either side thereof, which are evenly distributed over the core between the grooves. The function of the coils 15 is primarily to nullify the re-actance of the coils 9. Either of the coils 9 or 15 may be short-circuited, the coil 9 being so shown in Fig. 2ª, or the coils may be wound in opposite directions and connected in series, as shown in Fig. 3.

In operation, referring to Fig. 2ª, suppose first the coil 9 to be traversed by the maximum positive flux, then the rotor to be moved to a position wherein no flux will be sent from its poles through said coil. During this period of movement a current will be generated in coil 9 which will result in a m. m. f. which will so affect the flux in the two sections of coil 15 as to cause to be generated therein an e. m. f. corresponding to the first half of the part 2 of the wave shown in Fig. 1. During the next period of movement of the rotor to the position where the maximum positive flux traverses the coil 9 in the opposite direction the second half of the part 2 of the wave shown in Fig. 1 is generated in a similar manner. Subsequently the flux emanating from the rotor and traversing the coil 9, generates a current therein which affects the coil 15 to generate a current corresponding to that below the datum line in Fig. 1.

To oppose the tendency of any self inductive flux to close through the pole face, I may provide short-circuited coils 25, carried by the broad poles 23, in the manner indicated in Fig. 2, or carried jointly by the narrow and broad poles in the manner indicated in Fig. 4, the coils 9 being omitted in this figure for the sake of clearness, the turns of the coil 25 being concentrated upon one side in a slot in the narrow pole and distributed over the face of the broad pole upon the other side, the manner of winding these coils being shown in plan view in Fig. 7. The reluctance over the broad poles may also be increased by making the airgap wider than over the narrow poles.

I may arrange the neutralizing coil in the manner shown at 16 in Fig. 5, so that while still serving to neutralize the magnetomotive force due to self induction of the coils 9, 10, in a path indicated by line 24, as well as in a path indicated by line 26.

In Fig. 5 I have omitted the coils 9, and have shown the coils 16 only for the purpose of clearness.

In Fig. 3, I have shown coil 9 combined and connected in series with coil 16, the turns of which encircle the core continuously in the opposite direction. When the pole 8 is in the dotted line position 19, substantially half of the pole flux flows to the left through the coil 9, and when the pole has moved into position shown in full lines, the flux passes upon either side of the coil without threading it. When the pole has moved into dotted line position 20, substantially half of the pole flux again passes through the coil 9, but to the right or in the opposite direction than previously. Thus between the positions 19 and 20, the variation of flux traversing the coil 9, has changed nearly to the extent of the entire pole flux and has produced an electromotive force corresponding to this change, the rapidity of the change producing the high voltage positive current wave shown in Fig. 1. The self inductive flux which would have been produced by this current in the coil 9 is neutralized or nullified by counter m. m. f. of the coil 16, the turns of which lie upon either side thereof and in close mutual inductive relation, the same effect being produced in Figs. 2 and 2ᵃ by the coil 15.

As previously stated, the turns of the coils 15, are radially disposed and evenly distributed over the core. The turns of the coils 16, however, are uniformly distributed along the inner periphery but are concentrated in the grooves upon the outer periphery.

In Fig. 3, between the positions 19 and 20, the pole flux decreases in those turns to the right of the groove and increases in the turns to the left of the groove, and the changes being in opposite directions generate an electromotive force in the same direction. The coils 9 and 16 are connected in series in the proper manner, as indicated, to add these electromotive forces so that they may be utilized in the external or useful circuit. As the pole 8 continues its movement toward the left, from the position 20, the flux flowing to the right through coil 9, gradually decreases until it reaches the mid-position between the grooves when no flux lines pass through the coil and from this time until this pole occupies the position corresponding to position 19 at the next succeeding coil, the flux in said coil gradually increases in the opposite direction due to the flux from the succeeding pole 7. This gradual decrease and subsequent gradual increase of flux in the counter-direction through the coil 9, produces the low voltage negative current wave of Fig. 1.

It is evident that those conductors in the outer grooves 13, 14, in the arrangements previously described, which carry currents flowing in opposite directions may be omitted without affecting the result, that is, the nullification of the magnetomotive forces of self induction of the armature, and this result is accomplished by arranging the windings in the manner shown at 18 in Fig. 6, and in plan view in Fig. 7. The operation will be understood from the previous detailed description of Fig. 3.

I have illustrated in the accompanying drawings several arrangements of windings which embody my invention but I am aware that various changes and modifications may be made within the scope of my claims and without departing from the spirit of my invention.

I claim:—

1. A dynamo electric generator for producing periodic voltages of unequal positive and negative values, comprising an inducing member having a plurality of poles, and an armature core provided with an induced winding having portions of the coils which constitute separate armature poles so related to one another that the said winding is substantially non-inductive.

2. A dynamo electric generator for producing periodic voltages of unequal positive and negative values, comprising an inducing member having a plurality of poles, a ring armature provided with an induced winding having the portions of the coils which constitute separate armature poles that are on its outer periphery concentrated in a small arc and the portions of said coils on its inner periphery being partly concentrated in a corresponding small arc and partly distributed upon each side of said arc.

3. A dynamo electric generator for producing periodic voltages of unequal positive and negative values, having an inducing member comprising a plurality of narrow poles, an armature having a laminated core provided with a plurality of transverse grooves equal to or an even multiple of the number of said narrow poles, and windings having portions concentrated in said grooves and portions uniformly distributed over the periphery of said core between said grooves whereby the relative rotation of said armature and said poles will cause a rapid change of magnetic flux through said concentrated portions and a gradual change through said distributed portions.

4. A dynamo electric generator for producing periodic voltages of unequal positive and negative values, comprising an inducing member having a plurality of narrow poles of the same sign, an armature having a laminated core concentric therewith and provided with a plurality of transverse grooves equal to or an even multiple of said poles, and a corresponding number of coils each having the conductors of one side concentrated in one of said grooves and the conductors of the other side uniformly distributed over the periphery of the core between adjacent grooves.

5. A dynamo electric generator for producing periodic voltages of unequal positive and negative values, comprising an inducing member having a plurality of narrow poles of the same sign, an armature having a laminated core concentric therewith and provided with a plurality of transverse grooves equal to or an even multiple of said poles, and a corresponding number of windings having portions concentrated in said grooves on one side of said core and portions extending upon opposite sides thereof and distributed over the periphery of said core between said grooves, the reciprocal relation between said concentrated and said distributed portions causing a nullification of the peripheral component of the self-induction of the windings.

6. A dynamo electric generator for producing periodic voltages of unequal positive and negative values, comprising an inducing member having a plurality of narrow poles of the same sign, an armature member having a laminated core concentric therewith, and a plurality of windings on said core equal to or a multiple of said poles, said windings having concentrated portions and circumferentially distributed portions extending upon opposite sides thereof, and the reciprocal inductive action between said portions producing a nullification of the resulting magneto-motive force acting along a peripheral path within the armature core.

In testimony that I claim the foregoing as my invention, I have signed my name in presence of two subscribing witnesses.

JEAN LUCIEN FARNY.

Witnesses:
ERNST FISCHER,
CARL GUBLER.

Copies of this patent may be obtained for five cents each, by addressing the "Commissioner of Patents, Washington, D. C."